Dec. 20, 1927.
J. E. ROBERTSON
LAMP OF MOTOR VEHICLES
Filed Nov. 20, 1926
1,653,064
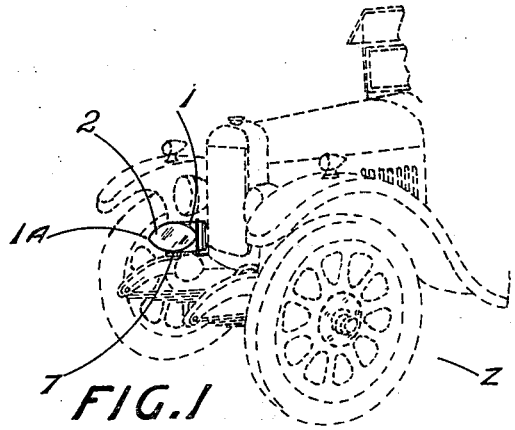
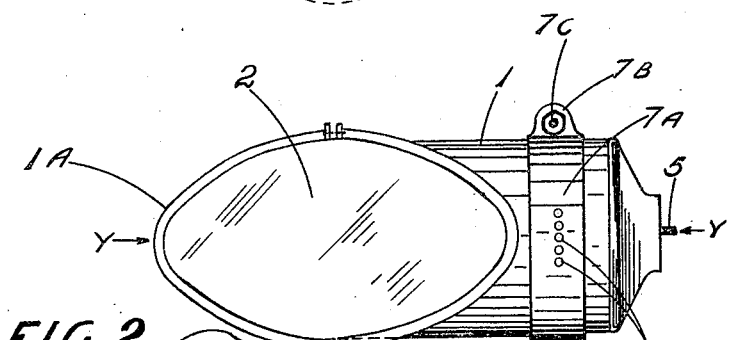
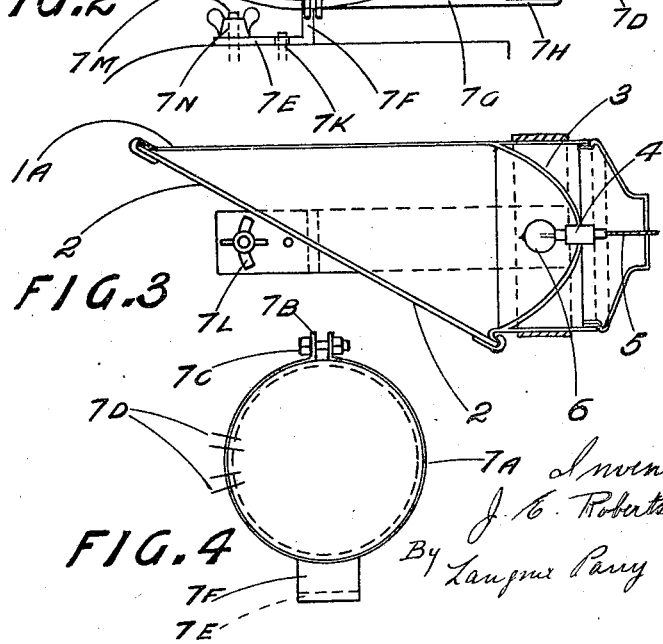

Patented Dec. 20, 1927.

1,653,064

UNITED STATES PATENT OFFICE.

JAMES EASTON ROBERTSON, OF DUNEDIN, NEW ZEALAND.

LAMP OF MOTOR VEHICLES.

Application filed November 20, 1926. Serial No. 149,613.

This invention relates to lamps, particularly head lamps of motor vehicles designed for the purpose of diverting dazzling rays from approaching vehicles.

The object of the invention is to obviate the dangerous practice of dimming when vehicles are approaching each other.

According to my invention, the lamp consists primarily in elongating a portion of the lamp shell, the projecting portion of the lamp being on the driver's side of the car, and the inner surface of the elongated portion of the said lamp shell is preferably fitted with a reflector, an extension of the present reflector, or the said inner surface may be plated or coated with a suitable reflecting medium to increase the efficiency of the rays.

Referring to the accompanying drawings;

Figure 1 is a general arrangement view showing the point on a car at which the lamp is preferably mounted.

Figure 2 is a side elevation looking in the direction of the arrow head Z in Figure 1.

Figure 3 is a horizontal sectional view on line Y—Y Figure 2.

Figure 4 is a detailed view showing the principle of mounting and means for adjusting the lamps.

The elongated lamp shell is indicated at 1. It will be observed that the projected part $1^A$ is produced to provide a sufficient area of glass front as indicated at 2; the said projection is such that while the driver of the approaching vehicle is protected against the dazzling rays, there are sufficient light rays directed to the road side to light up clearly any object of danger and permit the driver to veer over on his side by law and give the passing vehicle a wide berth.

The said means consisting of a metal band $7^A$, lugs $7^B$ attached thereto and a bolt $7^C$ engaging the said lugs, all the parts providing means whereby the said band $7^A$ may be clamped upon the lamp shell 1. The said band $7^A$ has a series of perforations $7^D$ therein, and there is a pin $1^A$ secured to the lamp shell 1, adapted to engage anyone of the said perforations in the band $7^A$ for the purpose of providing a variable adjustment for the lamp shell.

The supporting bracket is indicated at 7; it consists of base $7^E$, an upright member $7^F$ and a resilient member $7^G$, the metal band $7^A$ is secured to the said resilient member at the outer end $7^H$ thereof, and the said lamp shell 1 sits on the entire length of the said resilient member; the top surface of which is curved to correspond with the peripheral curve of the lamp shell 1.

The bracket 7 is preferably mounted on a side rail member of the chassis. The base member $7^E$ of the said bracket 7 has a hole $7^J$ therein, to engage with a pin $7^K$ fastened to and projecting upwards from the said side rail member, and there is a curved slot $7^L$ scribed and cut to a radius with the centre of the pin $7^K$ as the centre for scribing the radius of the said slots.

There is a stud $7^M$ secured to and projecting upwards from the side rail member of the chassis adapted to engage the curved slot $7^L$; the said stud $7^M$ is threaded to take a wing nut $7^N$, which is provided for the purpose of securing the said bracket 7 in its desired adjusted position upon the chassis. This adjustment in two directions is provided; the first mentioned adjustment is accomplished by slackening off the nut of the bolt $7^C$ of the band 7, then turning the lamp shell 1 in the metal bands support; this adjustment would be in a direction concentric with the axis of the lamp shell 1 to shorten the length of the projection of the rays from the lamp. The second mentioned adjustment is provided for the purpose of turning the lamp shell 1 on its support horizontally round the pivot pin $7^K$; in this adjustment, the distance of the rays is not shortened, but increases the angle of projection to the line of travel.

The reflector 3 is indicated as being produced in one piece, and the other parts necessary for a lamp as described consist of a lamp socket, wiring and a bulb, indicated respectively at 4, 5 and 6; a bracket supporting the lamp in position is indicated at 7 in Figure 1.

What I claim as new and desire to secure by Letters Patent is:

Improvements in and relating to the lamps of motor vehicles and the like, comprising an elongated lamp shell, a reflector lining the inner surface of the elongated portion of the lamp shell, means for adjusting the said lamp in a direction concentric with the axis thereof, and means for adjusting the said lamp shell in a horizontal direction, the said means for adjusting the said lamp shell consisting of a band clamped to the lamp shell, the said band having a series of perforations thereon, a pin attached to the lamp shell adapted to engage with any one of the series of the said perforations in said band, a supporting bracket adapted to permit adjustment of the said lamp shell horizontally in an arc upon a pivot, and means to clamp the said bracket in its adjusted position, for the purpose described.

In testimony whereof I affix my signature.

JAMES EASTON ROBERTSON.